US012140950B2

(12) United States Patent
Martinez Flores et al.

(10) Patent No.: US 12,140,950 B2
(45) Date of Patent: *Nov. 12, 2024

(54) AUTOMATED DRIVING OF A MOTOR VEHICLE

(71) Applicant: Volkswagen Aktiengesellschaft, Wolfsburg (DE)

(72) Inventors: Yael Abelardo Martinez Flores, Guadalajara (MX); Hendrik Decke, Braunschweig (DE); Julian-Steffen Müller, Hannover (DE); Marcel Aguirre Mehlhorn, Wolfsburg (DE); Tobias Kain, Oberndorf/Melk (AT)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,228

(22) Filed: Aug. 15, 2023

(65) Prior Publication Data

US 2023/0384789 A1 Nov. 30, 2023

Related U.S. Application Data

(63) Continuation of application No. 17/703,601, filed on Mar. 24, 2022, now Pat. No. 11,740,627.

(30) Foreign Application Priority Data

Mar. 26, 2021 (EP) ..................... 21165241

(51) Int. Cl.
*G05D 1/00* (2024.01)
*B60W 50/14* (2020.01)
*H04W 4/46* (2018.01)

(52) U.S. Cl.
CPC ........... *G05D 1/0077* (2013.01); *B60W 50/14* (2013.01); *G05D 1/0293* (2013.01);
(Continued)

(58) Field of Classification Search
CPC .. G05D 1/0077; G05D 1/0293; G05D 1/0295; B60W 50/14; B60W 2556/65;
(Continued)

(56) References Cited

U.S. PATENT DOCUMENTS 11,740,627 B2 * 8/2023 Martinez Flores ... B60W 50/14
  701/23
2021/0001868 A1 1/2021 Ahn et al.
(Continued)

FOREIGN PATENT DOCUMENTS

DE 102012002280 A1 8/2012
DE 102018207533 A1 11/2019
WO 2020177980 A1 9/2020

OTHER PUBLICATIONS

EP Application No. 21165241.7. Search Report (Sep. 24, 2021).

*Primary Examiner* — Donald J Wallace
(74) *Attorney, Agent, or Firm* — Peter Zura; LOZA & LOZA, LLP (57) ABSTRACT

Technologies and techniques for the at least the partially automated driving of a motor vehicle. A first application and at least one redundant second application provide output data depending on motor vehicle operating data and/or environmental data. Vehicle driving data for the at least partially automated driving of the motor vehicle are determined depending on the output data. Vehicle operating data from another vehicle are received, and, depending on the vehicle operating data, the at least one redundant second application switches from an active state to a standby state in which a computer instance of a computer unit used by the at least one redundant second application is at least executed at a lower frequency than in the active state.

20 Claims, 4 Drawing Sheets

(52) U.S. Cl.
CPC .......... *G05D 1/0295* (2013.01); *H04W 4/46* (2018.02); *B60W 2556/65* (2020.02)

(58) Field of Classification Search
CPC ....... B60W 2050/065; B60W 2552/45; B60W 30/165; B60W 50/023; B60W 60/0015; B60W 30/10; B60W 30/18; B60W 50/00; B60W 50/0098; B60W 2554/4023; B60W 2555/20; B60W 2756/10; H04W 4/46; G06F 11/1479
See application file for complete search history.

(56) References Cited

U.S. PATENT DOCUMENTS

| | | |
|---|---|---|
| 2021/0129779 A1 | 5/2021 | Kim et al. |
| 2021/0291851 A1 | 9/2021 | Melen et al. |
| 2022/0176980 A1 | 6/2022 | Fujimoto |
| 2022/0198839 A1 | 6/2022 | Santamala et al. |
| 2022/0324440 A1 | 10/2022 | Ewert |

\* cited by examiner

Fig. 7

AUTOMATED DRIVING OF A MOTOR VEHICLE

RELATED APPLICATIONS

The present application is a continuation of U.S. patent application Ser. No. 17/703,601 filed Mar. 24, 2022, titled "Automated Driving of a Motor Vehicle," which will issue as U.S. Pat. No. 11,740,627, which claims priority to European Pat. App. No. 21165241.7 to Martinez Flores, et al., filed Mar. 26, 2021, titled "Automated Driving of a Motor Vehicle", the contents of each being incorporated by reference in their entirety herein.

TECHNICAL FIELD

The present disclosure relates to technologies and techniques for the partially automated driving of a motor vehicle. The present disclosure further relates to a computer program product comprising a program for a computer unit of a vehicle controller of a motor vehicle, and to a vehicle controller for the at least partially automated driving of a motor vehicle. Moreover, the present disclosure also relates to a motor vehicle with a vehicle controller for the at least partially automated driving of the motor vehicle.

BACKGROUND

Generic methods, vehicle controllers, and motor vehicles are known in the art. Automated driving of motor vehicles, particularly at least partially automatically driven motor vehicles, use a plurality of computer program applications or applications in order to analyze environmental information. The environmental information may be present in the form of environmental data that were captured by one or more environmental sensors. These applications must be sufficiently reliable and robust to be effectively operated under a wide range of circumstances. Computer program applications such as those executed in at least partially autonomous motor vehicles analyze a great variety of data in order to determine the best course of action. Furthermore, at least partially autonomous motor vehicles carry out a plurality of redundant computer instances of important applications in order to be able to achieve a robust system overall. However, such applications, as well as applications that are redundant to these, require a significant quantity of resources, particularly with respect to the consumption of energy by the respective instance executed and with respect to resources of one or multiple computer units.

SUMMARY

The present disclosure is directed to improving, particularly reducing, the consumption of energy or the consumption of the resources of a computer unit.

Accordingly, in various examples, methods, vehicle controllers and a motor vehicle are disclosed in the features of the independent claims.

Advantageous further developments result from the features of the dependent claims.

In some examples, a method is disclosed, wherein a first application and at least one redundant second application each provide output data depending on vehicle operating data and/or environmental data. Vehicle driving data for the at least partially automated driving of the motor vehicle are determined, and vehicle operating data from another vehicle are received. Depending on the vehicle operating data from the other vehicle, the at least one redundant second application switches from an active state in which the determination of the vehicle driving data, taking into account the output data from the at least one redundant second application takes place, to a standby state in which a computer instance of a computer unit used by the at least one redundant second application is at least executed at a lower frequency than in the active state.

In some examples, a controller is disclosed, wherein a vehicle controller includes a program-controlled computer unit that is configured by means of a first application and at least one redundant second application to in each case provide output data depending on motor vehicle operating data and/or environmental data, to determine vehicle driving data for the at least partially automated driving of the motor vehicle depending on the output data. Vehicle operating data from another vehicle may be received, and depending on the vehicle operating data from the other vehicle, to switch the at least one redundant second application from an active state, in which the determination of the vehicle driving data is done taking into account the output data from the at least one redundant second application, to a standby state in which a computer instance of a computer unit used by the at least one redundant second application is at least executed at a lower frequency than in the active state.

In some examples, a motor vehicle is disclosed that includes a vehicle controller, configured pursuant to the present disclosure.

In some examples, a computer program product is disclosed, that includes a program for a computer unit of a vehicle controller of a motor vehicle, whereby the program has program code segments of a program for executing the steps of the method pursuant to the present disclosure when the program is executed by the computer unit.

The present disclosure also includes the combinations of the features of the embodiments described.

BRIEF DESCRIPTION OF THE DRAWINGS

Exemplary embodiments of the present disclosure are described below. They show.

DETAILED DESCRIPTION

The exemplary embodiments disclosed herein are preferred exemplary embodiments of the present disclosure. In the exemplary embodiments, the components described each constitute individual features of the present disclosure to be considered independently of one another, which also further develop the present disclosure in each case even independently of one another and thus also individually or in a combination other than the one shown are to be regarded as a component of the present disclosure. Furthermore the exemplary embodiments described may also be supplemented by other already-described features of the present disclosure.

In the figures functionally equivalent elements are in each case provided with the same reference numbers.

The present disclosure is directed to configurations for carrying out dynamic reconfigurations of a vehicle controller, based on information or data received from other vehicles. The vehicle controller, particularly its computer unit, analyzes current context and determines requirements with respect to a safety level. By means of the fact that both can be used, namely data determined by the vehicle itself as well as vehicle operating data from the other vehicle, the vehicle controller can determine which system configuration, particularly with respect to the at least one computer unit of the vehicle controller, is adjusted, whereby the objective is to be able to achieve the most efficient configuration possible. This includes, among other things, the consumption of energy as well as the use of computer resources. At the same time it should be possible to comply with the safety requirements determined. Here, the present disclosure may identify such applications that can switch from an active state to a standby state, for example because the level with respect to redundancy can be reduced for these application[s], or the frequency of the execution of these applications and in particular also the computer instances associated therewith can be reduced. The execution of fewer or less resource-intensive applications can lead to the reduction in resources, as cited above.

In some examples, at least partially automated vehicles, or at least partially autonomous vehicles, may be configured with a plurality of computer program applications, such as applications for perceiving or capturing the environment, planning, particularly with respect to the determination of trajectories, vehicle control services and/or the like. In general, an application or a computer program application may be considered a functionality that converts input data, for example sensor data, data from other applications or the like, into output data, for example instruction data, commands, analysis of the input data and/or the like. Since many such computer program applications are critical to safety, they are executed redundantly, wherein a vehicle controller may execute multiple applications that realize the same functionality, for example determining a trajectory or the like. The redundant applications may be either homogenous, for example in that a specific applications is executed multiple times at once, or even heterogenous, in that multiple different applications provide the same functionality.

In some examples, the present disclosure is directed to configurations where an at least partially automatically driven motor vehicle can communicate with other motor vehicles or other vehicles, and data can be transmitted securely, reliably and quickly. The data received from the other vehicle allow the implementation of the present disclosure in that the data received are used to determine whether an application can switch to a standby mode, for example in that the number of operations executed can be reduced, or the application can be deactivated. The vehicle operating data from the other vehicle can comprise, for example, data from a lidar, a radar, a camera, a tachometer, a temperature sensor, a brake sensor, an analysis of sensor data, output data from computer program applications, data from a GPS sensor and/or the like.

The present disclosure makes it possible to achieve increased efficiency and optimize the resource allocation for computer program applications, preferably when certain conditions are adhered to. For example, such a condition may be that there is reliable communication and reliable data transfer between the motor vehicles. As soon as reliable communication can be established the motor vehicles can transfer data between them that can be used by the respective other motor vehicle. The data received can be used to determine whether computer program applications can be switched to the standby state or even deactivated. Preferably this switch is dependent on the information that was transferred or received and from context conditions, for example a current driving state such as road properties, weather, traffic conditions, the reliability of the communication connection, any priority of the respective computer program application and/or the like. Furthermore the switch can also be dependent on the current safety level. Here it can be provided that a switch to the standby state is not allowed if thereby the safety level achieved falls below a predetermined safety level.

In some examples, a first application or computer program application may be configured as an application for which a continuous intended operation is provided. The redundant second application, on the other hand, may be configured as an application that provides the same functionality redundantly and that can switch between the active state and the standby state. Should a communication between the motor vehicle and any other vehicle take place, the redundant second application is, as a rule, in the active state. In this case no vehicle operating data from another vehicle need be present. If, on the other hand, vehicle operating data from another vehicle are received, there is the possibility that the redundant second application can switch from the active state to the standby state, so that the computer instance of the computer unit used by the redundant second application is at least executed at a lower frequency than in the active state (degraded mode). The computer instance used by the redundant second application can, for example, be a machine code that is executed directly by the computer unit.

In some examples, an active state for the redundant second application may be configured to provide essentially the same functionality as the first application, so that redundancy can be achieved. In the standby state the functionality can be limited or even omitted (active-low mode). In this way not only can energy be saved, but by means of the fact that the computer instance is no longer needed so frequently or even not needed at all, the corresponding resources of the computer unit can be freed up so that other functions can be executed more quickly and/or better.

The vehicle controller preferably has at least one computer unit that allows the provision of a functionality based on a computer program.

In some examples, before switching the at least one redundant second application from the active state to the standby state, for a predetermined time period the vehicle driving data are determined independently of the output data from the at least one redundant second application. In this state, the redundant application may continue to supply full functionality, but the corresponding output data from the redundant second application may no longer be taken into account (active-high mode). This makes it possible to determine the vehicle driving data using the vehicle operating data from the other vehicle, whereby the vehicle operating data can at least partially replace the redundant second application. At the same time, during this predetermined time period it can be assured that the reliable function for determining the vehicle driving data continue to be given with respect to the redundancy. If, during the predetermined time period a disruption occurs, a switch to the use of the output data from the redundant second application can be made without delay or these can be taken into account additionally, so that the required safety level or the desired safety level can continue to be assured. This configuration proves to be especially advantageous if the reliability of the communication between the motor vehicle and the other vehicle changes, particularly deteriorates, or after establishing the communication connection it did not yet achieve the necessary reliability.

In some examples, the switching of the at least one redundant second application from the active state to the standby state may take place depending on a comparison of the output data from the at least one redundant second application with the vehicle operating data from the other vehicle. To this end, specific data from the vehicle operating data from the other vehicle may be selected, which can then be compared with the output data from the redundant second application. If, through the comparison a sufficient measure of correspondence is achieved, the switch may be released or triggered. Furthermore, it can naturally be provided that the comparison takes place over a predetermined time period and in this time period a sufficient correspondence is in essence given continuously. In this way a further improvement of the execution of the method can be achieved.

In some examples, the standby state may use a passive state without the use of the computer instance. This has the advantage that the computer instance can be released for use by other applications or even deactivated completely (active-low mode). In this way computer resources with respect to the computer unit can be freed up. Finally, in this way the computer unit can also be more efficiently operated because the number of computer operations can be reduced.

In some examples, the output data from the first application may be compared with the vehicle operating data from the other vehicle. This configuration makes it possible to carry out a comparison independently of the redundant second application. In this way the reliability can be further increased.

In some examples, the at least one redundant second application may switch from the standby state to the active state independently of the comparison. This configuration makes it possible to carry out a verification of the reliability during the standby state of the at least one redundant second application and in the event of a safety level lower than the predetermined safety level, depending on the comparison, to transfer the at least one redundant second application back to the active state, so that for example the redundant second application provides the intended functionality of the first application so that the vehicle operating data from the other vehicle are no longer needed. This is advantageous particularly when, due to the fact that communication between the motor vehicle and the other vehicle becomes unreliable, the vehicle operating data received from the other vehicle can no longer be used sufficiently for the reliable functioning of the vehicle controller, because they are, for example, disrupted or incomplete.

In some examples, when switching between the standby state and the active state, the at least one redundant second application may take into account a prescribed safety level. The safety level serves to prescribe the extent of required redundancy for reliable automated driving of the motor vehicle. The safety level may be situation-dependent. The safety level may be determined currently for a particular driving situation, or for a particular driving state, respectively, and compared with the predetermined safety level. If the safety level determined is less than the predetermined safety level, it may be provided that the redundant second application remains permanently in the active state, meaning that a switch to the standby state is prevented.

In some examples, a warning signal may be emitted independently of a comparison of the output data from at least the first or at least one redundant second application with the vehicle operating data from the other vehicle. The warning signal can preferably be emitted if the comparison shows that the output data from the respective application deviate significantly from the advantageously relevant vehicle operating data from the other vehicle. To this end a tolerance range can be prescribed within which a warning signal need not be emitted. The warning signal is then preferably emitted if through the vehicle operating data from the other vehicle the tolerance range that may preferably be prescribed by the output data, is exceeded. The warning signal can serve to emit a notification to a vehicle occupant of the motor vehicle, particularly the driver of the motor vehicle. But only one warning signal can be emitted for the vehicle controller.

In some examples, a current driving state of the motor vehicle may be determined, and the at least one redundant second application supplementarily, depending on the current driving state, is operated in the active state or the standby state. This configuration allows taking into account that for certain driving situations that may be specified by a current driving state of the motor vehicle, engaging the standby state by the at least one redundant second application be avoided to the extent possible. This may be advantageous, for example, if the motor vehicle is operated in an area in which very many pedestrians, for example children or the like, are present in the surrounding area. This can demand an especially high level of reliability or an especially high safety level, whereby it may be taken into account that the other vehicle may possibly not be able to provide all relevant environmental data.

Furthermore, the reliability of a communication connection may be determined and the at least one redundant second application additionally, depending on the reliability, may be operated in the active state or in the standby state. This configuration makes it possible, independently of the reliability of the communication connection, to keep the redundant second application in the active state or to allow it to engage the standby state. If the communication connection is, for example, unreliable, e.g., the vehicle operating data from the other vehicle are transmitted only at times or even only incompletely, the active state is retained. Only if the reliability reaches a predetermined extent can the engagement of the standby state be released.

In some examples, the at least one redundant second application may be additionally operated in the active state or the standby state, depending on a priority with respect to the first and the at least one redundant second application. The priority can, for example, be application-related. For example, the priority may refer to the fact that an application recognizes pedestrians. Such an application will as a rule have higher priority. Another application may, for example, refer to the determination of weather conditions. Such an application may, for example, have a correspondingly lower priority. The priority need not be constant in the intended operation of the vehicle control and may be varied depending on the situation. In principle, however, the priority can also be fixed.

In some examples, the at least one redundant second application may be additionally operated in the standby state, depending on a convoy operation. In this example it may be provided that the vehicle controller is able to recognize a convoy operation and with one or multiple other vehicles engage a corresponding operating mode. One of the motor vehicles will then be a lead vehicle, while the other vehicles are following vehicles. For such a convoy operation a series of vehicle driving data required for the at least partially autonomic operation of the motor vehicle as a following vehicle may be provided, so that respectively redundant second applications need not be required for a series of functionalities. Therefore in such an operating state the respectively redundant second application may be primarily or permanently in the standby state. Only if the convoy operation is ended does the at least one redundant second application have to be activated in that it switches from the standby state to the active state.

The advantages and effects cited for the technologies and techniques pursuant to the present disclosure apply equally to the computer program product of the present disclosure, the vehicle controller of the present disclosure and the motor vehicle pursuant to the present disclosure, and vice versa. In particular, therefore, method features may also be formulated as device-related and vice versa.

The present disclosure also includes further developments of the vehicle controller pursuant to the present disclosure and of the motor vehicle pursuant to the present disclosure that have features as were already described in connection with the further developments of the method pursuant to the present disclosure. For this reason the corresponding further developments of the vehicle controller pursuant to the present disclosure and of the motor vehicle pursuant to the present disclosure are not described again here.

Figure 5:
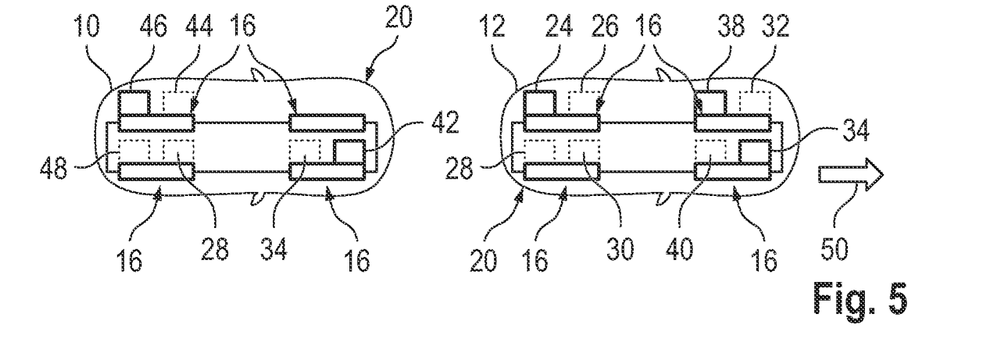
FIG. 5 illustrates a schematic representation as in FIG. 1 for a convoy operation pursuant to a fifth scenario under some aspects of the present disclosure.
Figure 6:
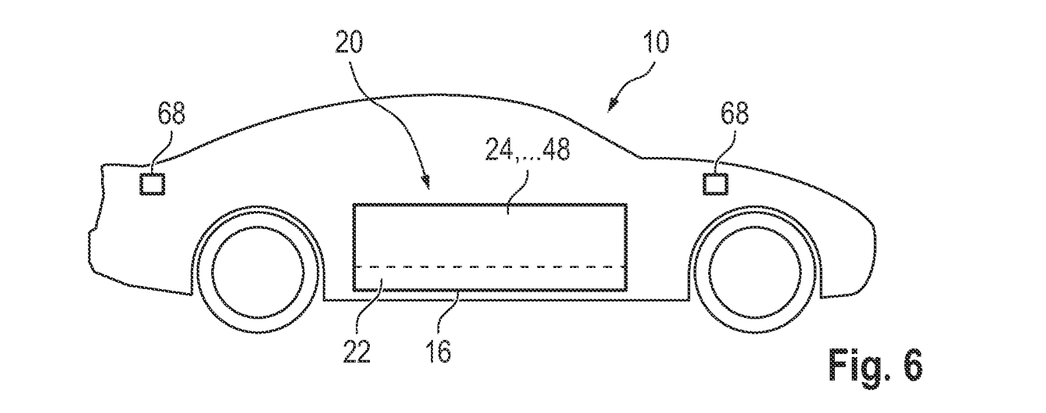
FIG. 6 illustrates a schematic side view of a motor vehicle under some aspects of the present disclosure.

FIG. 6 shows in a schematic side view a motor vehicle 10 with a vehicle controller 20 that is configured to drive the motor vehicle 10 at least partially automatically. In the present case an at least partially autonomous driving operation is provided. The vehicle controller 20 has a computer unit 16 that here—as may be seen from FIGS. 1 to 5—comprises four computer nodes CN1 to CN4. The computer nodes CN1 to CN4 communicate with one another via a communication bus. The communication bus is not identified in the figures. From FIG. 6 it may further be seen that the computer unit 16 has computer instances 22 that are used by applications 24 to 48, to be explained below, or are assigned to these.

The motor vehicle 10 further comprises environmental sensors 68, that transmit corresponding environmental signals to the vehicle controller 20, in particular the computer unit 16. Furthermore, the vehicle controller 20 also provides motor vehicle operating data that identify operating states of the motor vehicle 10. The environmental data and the motor vehicle operating data are marked here with the reference number 52 (FIG. 7).

Figure 7:
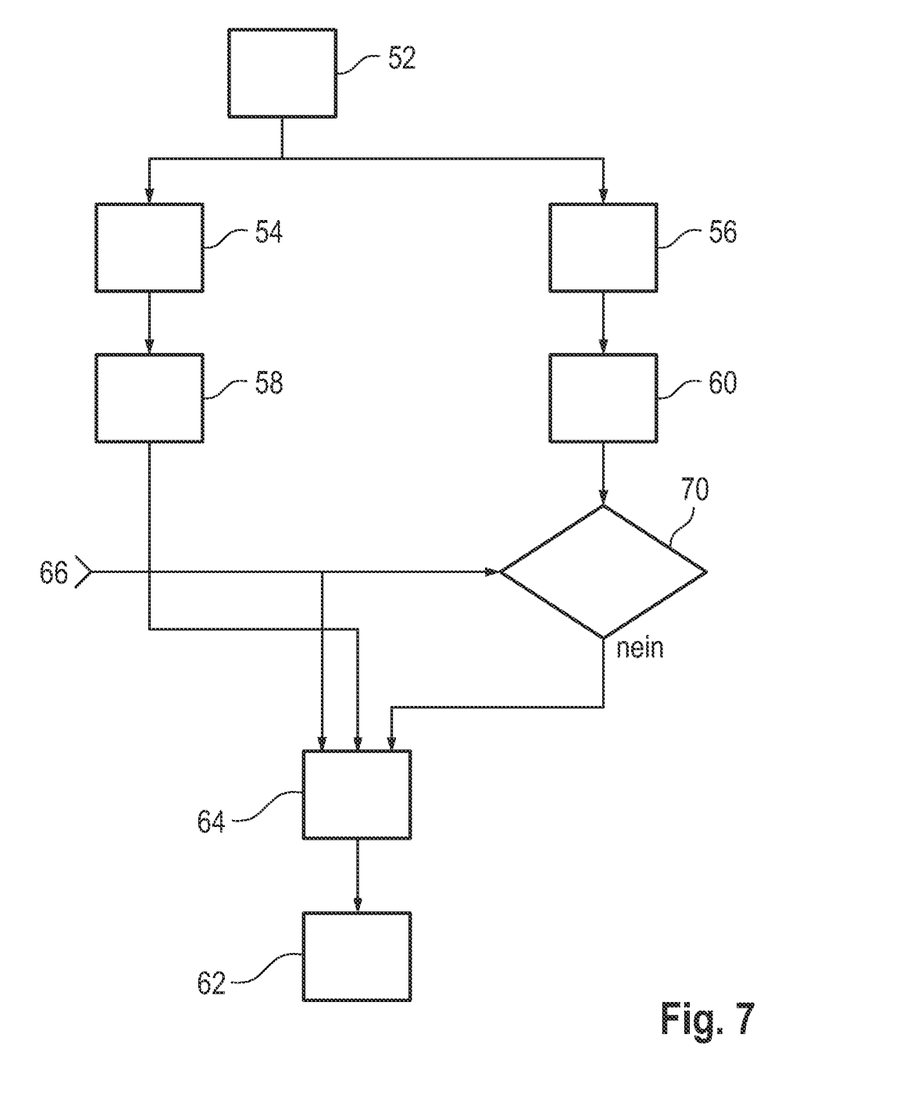
FIG. 7 illustrates a schematic flow chart for a method under some aspects of the present disclosure.

FIG. 7 shows in a schematic flow chart a possible method-based sequence in pursuant to the present disclosure. In alternative configurations, naturally, supplementary and/or alternative steps may be provided, for example pursuant to features of dependent claims.

Pursuant to FIG. 7 a first application 54 and a redundant second application 56 are provided. However, the present disclosure is not limited to the use of only two applications. Naturally, multiple second applications may also be provided. The first application 54 provides output data 56 and the redundant second application output data 60. The output data 58, 60 are provided by the respective application 54, 56 independently of the motor vehicle operating data and/or environmental data 52.

The output data 58, 60 serve, among other things, to determine vehicle driving data 62 that make it possible to drive the motor vehicle 10 at least partially automatically. The vehicle driving data 62 may, for example, show a trajectory that can be used as the basis for driving the motor vehicle 10.

As will be explained using the examples of FIGS. 1 to 5 below, the motor vehicle 10 may be configured for car-to-car communication with another vehicle 12, which is also a motor vehicle (FIGS. 2 to 5). The motor vehicle 10 receives from the other vehicle 12 the latter's vehicle operating data 66. These vehicle operating data 66 serve the at least partially automated driving of the other vehicle 12 and can be used by way of supplement for driving the motor vehicle 10. In particular, it is possible to monitor the function of the vehicle controller 20 and under some circumstances to also simplify it, in that the redundant second application 56 switches from an active state in which the determination of the vehicle driving data 62 is done by taking into account the output data 60 of the redundant second application 56, to a standby state in which a computer instance 22 of computer unit 16 used by the redundant second application 56 is executed at least at a lower frequency than in the active state. In some examples, the corresponding computer instance 22 may even be completely released or deactivated so that the computer capacity of the computer unit 16 can be made available for other functionalities. Furthermore, by deactivation of the computer instance 22 energy consumption, particularly with respect to the computer unit 16, can naturally be reduced.

In some examples, the vehicle operating data 66 of the other vehicle 12 may be fed into a vehicle driving data determination unit 64 to determine the vehicle driving data. Furthermore, the vehicle operating data 66 are supplementarily fed into a comparison unit 70 into which the output data 60 are also fed.

The comparison unit 70 compares the vehicle operating data 66 with the output data 60 to the effect that the vehicle operating data 66 are within a tolerance range prescribed for them with respect to the output data 60. If this is the case, then the comparison unit 70 transmits, instead of the output data 60, the vehicle operating data 66 to the vehicle driving data determination unit 64. At the same time the comparison unit 70 emits a corresponding warning signal to the vehicle controller 20 that the redundant second application 56 can switch to a standby state. The vehicle controller 20 then ends the redundant second application 56 so that the computer instance 22 used by this redundant second application 56 can be deactivated if there are no other obstacles to the switch.

Figure 1:
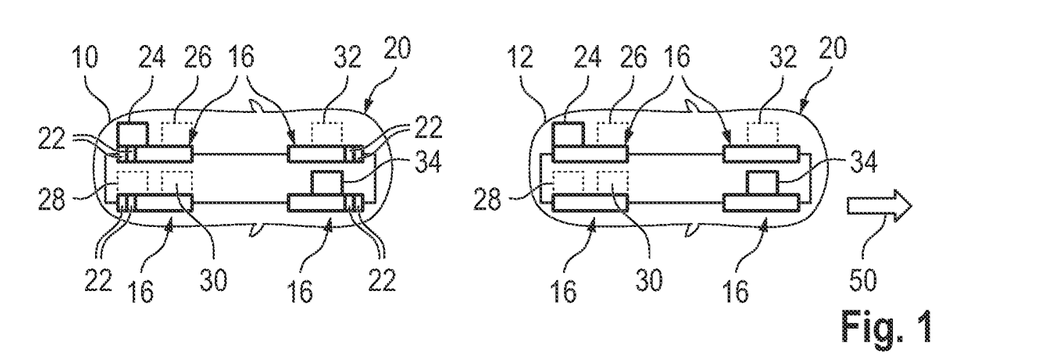
FIG. 1 illustrates a schematic top view of two motor vehicles driving one behind the other in the same direction, pursuant to a first scenario, are autonomously driven independently of one another under some aspects of the present disclosure.

FIG. 1 now shows a starting situation pursuant to a first scenario in which two at least partially autonomously driven motor vehicles 10, 12 are driving one behind the other in the same direction 50. The other vehicle 12 is the motor vehicle in front, while the motor vehicle 10 is the following motor vehicle. The structure of the vehicle controllers 20 of the motor vehicles 10, 12 is essentially the same here, so that it is explained only for the motor vehicle 10. For alternative configurations the vehicle controllers 20 may also differ from one another.

As a rule, the first application 54 may be operated in the active state. In this scenario, this active state is normally also not ended.

It should be noted that the motor vehicle 10 has the vehicle controller 20 with the computer unit 16, whereby computer unit 16 has four computer nodes CN1 to CN4, which are in communication with one another via a communication bus not further identified. Each computer node CN1 to CN4 has multiple computer instances 22 that can be activated or deactivated as needed. However, they can also be variably activated with regard to the frequency of their use.

Figure 2:
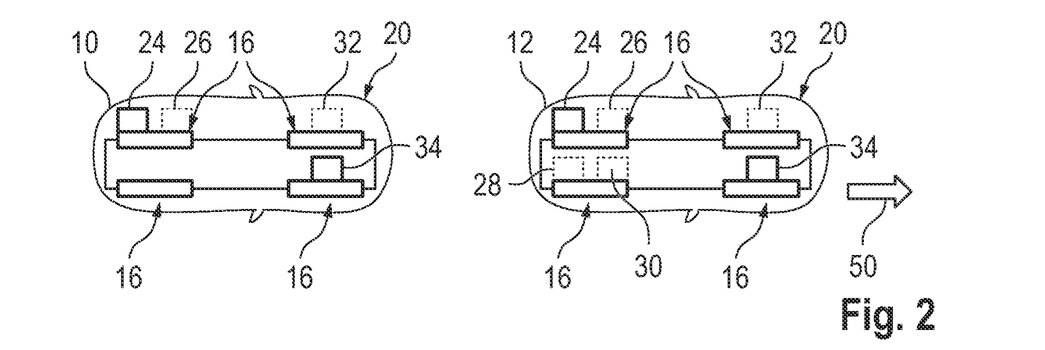
FIG. 2 illustrates a schematic representation as in FIG. 1, whereby the motor vehicles pursuant to a second scenario are in communication with one another via car-to-car communication and exchange vehicle operating data, whereby the following motor vehicle operates redundant applications in a standby state under some aspects of the present disclosure.

On the computer nodes CN1 to CN4 respective applications 24 to 34 are provided, as may be seen from FIG. 2. The applications 24, 28, 32 here are trajectory planner applications, while the applications 26, 30, 34 are pedestrian detection applications. These applications are provided solely by way of example, in order to explain the functioning of the present disclosure. For alternative configurations additional or other applications may also be provided here.

A solid line shows that the applications 24 and 34 are operated in the active state. On the other hand, the applications 26, 28, 30, 32 are represented with a dotted line, which means that while they are operated in an active state, their output signals or output data are not drawn upon to determine the vehicle driving data. These applications serve as redundant second applications so that in case of need, they can be used without delay. Therefore, the autonomous operation of the motor vehicle 10 here is primarily based on, among other things, the applications 24 and 34.

FIG. 2 now shows a situation comparable to the one in FIG. 1 in a schematic representation pursuant to a second scenario, whereby the motor vehicle 10 is in communication with the other vehicle 12 and receives vehicle operating data 66 from the other vehicle 12. These vehicle operating data 66 may include, for example, relative acceleration, output data from a trajectory planner and a pedestrian detection application. These data can be received by the motor vehicle 10 or the vehicle controller 20 and used to determine which redundant applications or instances are not required for the intended autonomous driving operation of the motor vehicle taking into account a predetermined safety level. In the present configuration it is shown that the applications 28 and 30 are no longer required for the required redundancy functionality. Therefore here it is provided that depending on the vehicle operating data 66 the applications 28, contrary to the first scenario pursuant to FIG. 1, switch from the active state to the standby state and here even to a passive state in which they are deactivated completely. In this way corresponding computer instances 22 for the computer unit 16 are freed up, so that the energy consumption can be reduced and/or computer resources can be freed up.

In the scenario pursuant to FIG. 2 it is provided only that the redundant second applications switch to the standby state. The active first applications 24, 34 continue to remain completely in the active state. Therefore the motor vehicle 10 can basically continue to be operated independently of the other vehicle 12. However, the vehicle operating data 66 of the other vehicle 12 may also be used as redundancy for the redundant second applications that are in the standby state. In this way the safety level that is predetermined can continue to be complied with. Should an active application of the motor vehicle 10 be disrupted, the operation of the motor vehicle 10 would be based on the communication with the other vehicle 12 until a new application is activated. Similarly, if the communication were disrupted, the motor vehicle would be activated only based on the active applications, until new active instances are executed or the communication is restored. In this case only the output data of the redundant second application would again be drawn upon for determining the vehicle driving data 62.

In the second scenario represented in FIG. 2 the motor vehicle 10 is driving behind the other vehicle 12. In this case the output data from the trajectory planner application 24 of the other vehicle 12 and the pedestrian detection application 34 from the motor vehicle 10 are also used. Therefore, the data transmission as such allows the motor vehicle 10 to transfer the corresponding redundant second applications 28, 30 to the standby state. However, this is executed only if the other requirements with respect to the safety level can be maintained.

Figure 3:
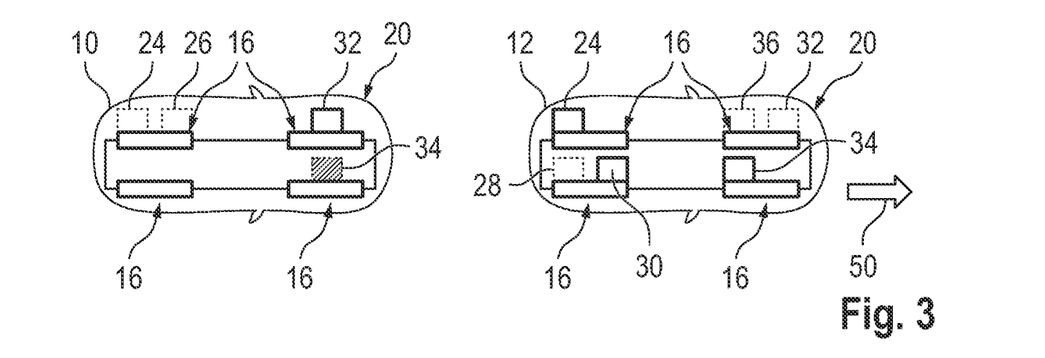
FIG. 3 illustrates a schematic representation as in FIG. 2, in which a redundant second application pursuant to a third scenario is operated in a passive operating state in which the responsible computer instance is deactivated under some aspects of the present disclosure.

FIG. 3 shows a schematic representation as in FIG. 2 pursuant to a third scenario, so that for the following explanations supplementary reference is made to the statements concerning FIG. 2. Below only the differences will be presented.

FIG. 3 shows the possibility, for an application that is a redundant application, to reduce an activate rate or frequency of use. This means that the corresponding application is executed less frequently. However, the corresponding application basically continues to remain activated (degraded), so that it receives input data for its intended operation, processes these and provides corresponding output data. However, fewer computer resources of the computer unit 16 are made available for the processing of the data. In FIG. 3, for example, the motor vehicle 10 compares the vehicle operating data 66 received from the other vehicle 12 with the output data 58, 60 to determine whether safe driving of the motor vehicle 10 can be guaranteed. If this is not the case, the application operated in the standby mode is transferred to the active state and the motor vehicle 10 is driven based on the output data 60 from this application.

One important advantage of the standby state with lower frequency is that it continues to be possible for the motor vehicle 10 to be able to be operated very quickly based on the output data 60, for example if the pedestrian detection application 28 detects a pedestrian who was not recognized by the other vehicle 12. Namely, if this application were operated only without the use of the output signals 60, the motor vehicle 10 could not use it to be able to detect the pedestrian. The continued operation of the redundant second application 56 at a lower frequency thus has an advantage here with respect to the safe autonomous driving of the motor vehicle. This is shown in FIG. 3 for the motor vehicle 10 with the gray-highlighted field for the application 34.

Even if the configurations pursuant to FIG. 3 and FIG. 2 appear similar, they are in fact different. For example, the scenario pursuant to FIG. 2 can occur in a city or an urban environment. In this case a higher safety level is demanded for the motor vehicle 10, particularly with respect to recognizing pedestrians, because the probability that many pedestrians are present in the environment is great. For this case a pedestrian detection application remains as active application 54 and another can be operated in the standby state, particularly in a passive state. The scenario pursuant to FIG. 3, for example, can be adopted in operating on a highway, where significantly fewer pedestrians are to be anticipated. For this reason it is possible here to select a standby state in which the frequency of the use of the computer instance 22 is lower than in the active state.

In this connection it is further noted that in the exemplary embodiment pursuant to FIG. 2, one of the trajectory planner applications is operated in the active state and one in a state in which the corresponding output data are not used (active-high). This is provided because with both urban scenarios and highway scenarios it must be possible to calculate the trajectory with the same frequency or incidence. Therefore the trajectory planner application should not be operated in a mode with lower frequency.

Figure 4:
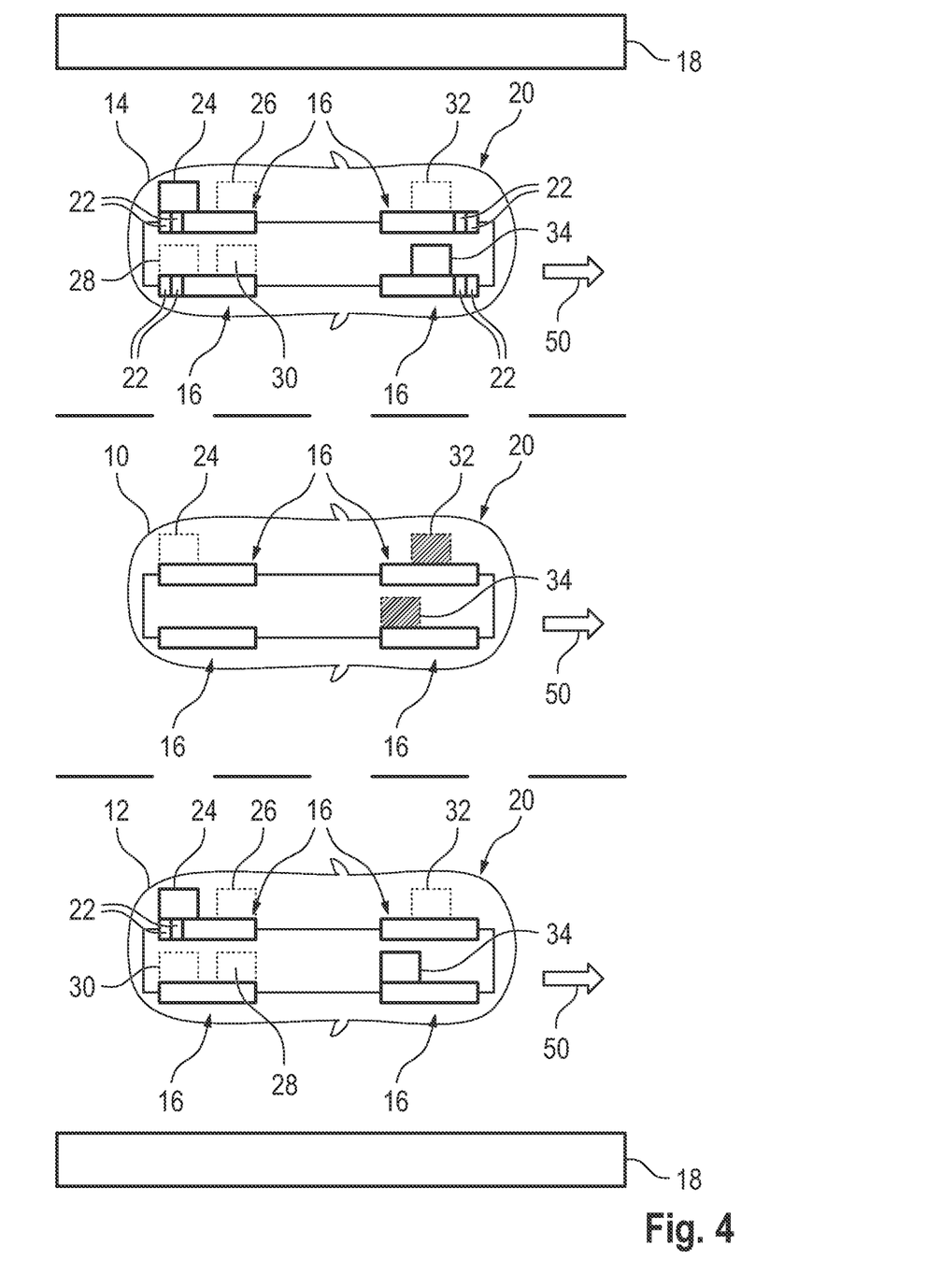
FIG. 4 illustrates a schematic representation as in FIG. 3 with three motor vehicles driving next to one another in the same direction on a road pursuant to a fourth scenario, whereby with respect to the middle vehicle two redundant second applications are operated in a passive operating state under some aspects of the present disclosure.

FIG. 4 shows another configuration pursuant to a fourth scenario in which, in addition, a second other vehicle 14 is provided. All three motor vehicles 10 to 14 are driving in the same direction 50 alongside one another in the respective adjoining lanes. The other vehicle 14 is driving in a left lane and overtakes the motor vehicle 10, which is driving in the center lane. The other vehicle 12 is driving in the right lane. All three motor vehicles 10 to 14 are in communication with one another.

Because of this communication, the motor vehicle 10 can realize its autonomous operation with applications in the standby state, whereby the respective applications are executed at a lower frequency than in the active state. This is possible because pedestrians crossing the center lane are extraordinarily improbable and the other vehicles 12 and 14 can forewarn the motor vehicle 10 if they detect a pedestrian. However, the corresponding application is not shut down completely because a minimum safety requirement is to be fulfilled.

Similarly, the motor vehicle 10 can determine its trajectory, whereby the trajectory planner application 32 can be executed here at a lower frequency than in the active state. This is possible because for the motor vehicle 10 in this scenario, which is driving between the other vehicles 12 and 14 in in the same direction, there are no great opportunities for changes in trajectory and the motor vehicle 10 knows based on the communication which positions are to be anticipated for the other vehicles 12 and 14. Furthermore any objects that are recognized in the driving direction by the other vehicles 12 and 14 are transmitted to the motor vehicle 10.

The street with the traffic lanes on which the motor vehicles 10 to 14 are driving is bordered by sidewalks 18.

Based on FIG. 1, another scenario may be possible, as follows. In this scenario it is assumed that no passive state for any of the applications 24 to 34 occurs. Both vehicles 10, 12 communicate with one another and exchange relevant data. Although both vehicles 10, 12 could reconfigure their respective computer units 16 in order to spare resources, no corresponding passive operational state is provided. The communication between the motor vehicles 10 and 12 therefore serves as a validation source, i.e. one of the motor vehicles 10, 12 uses the vehicle operating data 66 received to validate the output data 58, 60 from the respective applications 54, 56.

FIG. 5 shows another configuration of the present disclosure using a convoy operation. In this configuration, a lead vehicle is provided, which here is the motor vehicle 12. The lead vehicle 12 is followed by the motor vehicle 10 as following vehicle. Even if only two motor vehicles are provided here, the convoy formed thereby can naturally have a plurality of motor vehicles following one another.

The lead car 12 transmits relevant vehicle operating data 66 to the following vehicle 10. In this case, in which the transmitted vehicle operating data 66 include all the data required for the autonomous following by the following vehicle 10, the following vehicle 10 receives corresponding instructions from the lead vehicle 12 with respect to its operation. For this corresponding applications are provided, namely convoy manager applications 38, 40, 46, 48 and communication monitoring 42, 44. These applications can be used to realize the convoy behavior.

The convoy manager applications 38, 40, 46, 48 can be used to determine when a convoy can be formed. Furthermore, the convoy manager applications 38, 40, 46, 48 can, for example, determine which of the motor vehicles 10, 12 should be the lead vehicle. The communication monitoring 42, 44 can continuously validate the reliability and quality of the communication connection of the following vehicle 10 with the lead vehicle 12. This application indicates when the following vehicle 10 must be able to retake control. Such retaking is required, for example, if the quality of the communication connection decreases, the data are incomplete or invalid and/or the like.

The following vehicle 10 here executes all applications that are required to be able to autonomously drive the motor vehicle 10, whereby only the output data 58, 60 are not taken into account to determine the vehicle driving data 62. If the communication monitoring 42 requests to take over control of the motor vehicle 10, the output data 58, 60 from the active applications can be drawn upon without delay to determine the vehicle driving data 62, in order to be able to take over the control of the motor vehicle 10 independently of the lead vehicle 12.

Each motor vehicle may have a limited number of resources, particularly with respect to the computer unit 16. The present disclosure makes possible the execution of computer instances 22 and the deactivation of applications in such a way that computer resources and/or energy, too, can be saved. Furthermore, with the present disclosure safety can also be further improved in that the vehicle operating data 66 of the other vehicle 12 can be drawn upon to verify output data 58, 60 of the own motor vehicle 10.

In the configuration pursuant to FIG. 1 the system reliability of the vehicle controller 20 can be improved because the motor vehicles 10, 12 can verify the output data 58, 60 through those of the respective other motor vehicle 10, 12.

In the scenario pursuant to FIG. 5 a standby state is provided for the jointly executed applications. Therefore, computer resources can be freed up and in particular a more energy-efficient system can be achieved. However, one must bear in mind that in the event of a disrupted communication connection to the lead vehicle 12, the following vehicle 10 needs time to be able to restore any fully autonomous driving of the following vehicle 10.

The exemplary embodiments serve exclusively to explain the invention and should not limit it.

LIST OF REFERENCE NUMBERS 10 motor vehicle
12 other vehicle
14 other vehicle
16 computer unit
18 sidewalk
20 vehicle controller
22 computer instance
24 trajectory planner application
26 pedestrian detection application
28 trajectory planner application
30 pedestrian detection application
32 trajectory planner application
34 pedestrian detection application 36 pedestrian detection application
38 convoy manager application
40 convoy manager application
42 communication monitoring
44 communication monitoring
46 convoy manager application
48 convoy manager application
50 driving direction
52 motor vehicle operating data and/or environmental data
54 first application
56 redundant second application
58 output data
60 output data
62 vehicle driving data
64 vehicle driving data determination unit
66 vehicle operating data
68 environmental sensor
70 comparison unit

The invention claimed is:

1. A method for the at least the partially automated driving of a motor vehicle, comprising:
    determining vehicle driving data using first output data from a first application and second output data from at least one redundant second application; and
    processing vehicle operating data of another vehicle, to switch the at least one redundant second application from an active state to a standby state,
    wherein the active state is configured to process the second output data,
    and wherein the standby state comprises processing a computer instance of a computer unit by the at least one redundant second application at a lower frequency than in the active state.

2. The method according to claim 1, wherein determining the vehicle driving data comprises determining the vehicle driving data before the switching of the at least one redundant second application from the active state to the standby state.

3. The method according to claim 1, wherein determining the vehicle driving data comprises determining the vehicle driving data for a predetermined time, independently of the output data from the at least one redundant second application.

4. The method according to claim 1, wherein the switching of the at least one redundant second application from the active state to the standby state takes place depending on a comparison of the output data of the at least one redundant second application with the vehicle operating data of the other vehicle.

5. The method according to claim 1, wherein the standby state comprises a passive state that does not use the computer instance.

6. The method according to claim 1, further comprising comparing the output data of the first application with the vehicle operating data from the other vehicle.

7. The method according to claim 6, wherein, depending on the comparing of the output data of the first application with the vehicle operating data from the other vehicle, the at least one redundant second application switches from the standby state to the active state.

8. The method according to claim 1, wherein switching the at least one redundant second application from an active state to a standby state comprises processing a predetermined safety level prior to the switching.

9. The method according to claim 1, further comprising emitting a warning signal depending on a comparison of the output data from at least the first or the at least one redundant second application with the vehicle operating data from the other vehicle.

10. The method according to claim 1, further comprising one of:
    determining a current vehicle state of the motor vehicle, wherein the at least one redundant second application is supplementarily operated in the active state or the standby state, depending on the current driving state;
    determining the reliability of a communication connection to the other vehicle, wherein the at least one redundant second application is supplementarily operated in the active state or the standby state depending on the reliability;
    determining a priority with respect to the first and the at least one redundant second application, wherein the at least one redundant second application is supplementarily operated in the active state or the standby state depending on the priority; or
    determining a convoy operation, wherein the at least one redundant second application is supplementarily operated in the standby state, depending on the determined convoy operation.

11. A vehicle controller for the at least partially automated driving of a motor vehicle, comprising:
    communications for receiving vehicle operating data from another vehicle; and
    a program-controlled computer unit, operatively coupled to the communications, wherein the computer unit is configured to
        determine vehicle driving data using first output data from a first application and second output data from at least one redundant second application; and
        process the received vehicle operating data of another vehicle, to switch the at least one redundant second application from an active state to a standby state,
        wherein the active state is configured to process the second output data,
        and wherein the standby state comprises processing a computer instance of a computer unit by the at least one redundant second application at a lower frequency than in the active state.

12. The vehicle controller according to claim 11, wherein the computer unit is configured to determine the vehicle driving data by determining the vehicle driving data before the switching of the at least one redundant second application from the active state to the standby state.

13. The vehicle controller according to claim 11, wherein the computer unit is configured to determine the vehicle driving data by determining the vehicle driving data for a predetermined time, independently of the output data from the at least one redundant second application.

14. The vehicle controller according to claim 11, wherein the computer unit is configured to switch the at least one redundant second application from the active state to the standby state depending on a comparison of the output data of the at least one redundant second application with the vehicle operating data of the other vehicle.

15. The vehicle controller according to claim 11, wherein the standby state comprises a passive state that does not use the computer instance.

16. The vehicle controller according to claim 11, wherein the computer unit is configured to compare the output data of the first application with the vehicle operating data from the other vehicle.

17. The vehicle controller according to claim 16, wherein, depending on the comparing of the output data of the first application with the vehicle operating data from the other vehicle, the computer unit is configured to switch the at least one redundant second application from the standby state to the active state.

18. The vehicle controller according to claim 11, wherein the computer unit is configured to switch the at least one redundant second application from an active state to a standby state by processing a predetermined safety level prior to the switching.

19. The vehicle controller according to claim 11, wherein the computer unit is configured to perform one or more of:
  determine a current vehicle state of the motor vehicle, wherein the at least one redundant second application is supplementarily operated in the active state or the standby state, depending on the current driving state;
  determine the reliability of a communication connection to the other vehicle, wherein the at least one redundant second application is supplementarily operated in the active state or the standby state depending on the reliability;
  determine a priority with respect to the first and the at least one redundant second application, wherein the at least one redundant second application is supplementarily operated in the active state or the standby state depending on the priority; or
  determine a convoy operation, wherein the at least one redundant second application is supplementarily operated in the standby state, depending on the determined convoy operation.

20. A motor vehicle, comprising:
  a vehicle controller for the at least partially automated driving of the motor vehicle;
  communications for receiving vehicle operating data from another vehicle; and
  a program-controlled computer unit operatively coupled to the communications and the vehicle controlled, wherein the computer unit is configured to
    determine vehicle driving data using first output data from a first application and second output data from at least one redundant second application; and
    process the received vehicle operating data of another vehicle, to switch the at least one redundant second application from an active state to a standby state,
    wherein the active state is configured to process the second output data,
    and wherein the standby state comprises processing a computer instance of a computer unit by the at least one redundant second application at a lower frequency than in the active state.

* * * * *